Oct. 28, 1969 C. E. MORSE ET AL 3,475,557
AUTOMATIC TELEPHONE VOICE-DATA TRANSFER CIRCUIT
Filed Oct. 22, 1965 7 Sheets-Sheet 1

INVENTORS C. E. MORSE
J. P. SMITH
BY
SE Hollander
ATTORNEY

Oct. 28, 1969 C. E. MORSE ET AL 3,475,557

AUTOMATIC TELEPHONE VOICE-DATA TRANSFER CIRCUIT

Filed Oct. 22, 1965 7 Sheets-Sheet 4

Oct. 28, 1969 C. E. MORSE ET AL 3,475,557

AUTOMATIC TELEPHONE VOICE-DATA TRANSFER CIRCUIT

Filed Oct. 22, 1965 7 Sheets-Sheet 6

3,475,557
Patented Oct. 28, 1969

3,475,557

AUTOMATIC TELEPHONE VOICE-DATA TRANSFER CIRCUIT

Charles E. Morse and John P. Smith, Holmdel, N.J., assignors to Bell Telephone Laboratories, Incorporated, New York, N.Y., a corporation of New York Filed Oct. 22, 1965, Ser. No. 501,882
Int. Cl. H04m *11/00*
U.S. Cl. 179—2 12 Claims

ABSTRACT OF THE DISCLOSURE

An integrated voice and data communication system is disclosed for selectively connecting either voice or data termination apparatus at a substation to the communication channel. Normally, the channel is connected to the voice termination apparatus. In response to an incoming data call, the channel connection is transferred to the data termination apparatus. If an automatic answer of the incoming call by the substation is not accomplished within a predetermined time interval, the channel connection is transferred back to the voice termination apparatus.

This invention relates to integrated data and telephone voice communication systems and more particularly to data and voice communication systems in which connections are extended over a switched telephone network.

Certain prior art communication systems which include facilities for transmission of voice and data signals were predicated on the necessity for manually transferring the channel from voice to data or vice versa at both the originating and terminating locations. Under such an arrangement a conventional procedure was to initiate a connection by dialing the called telephone substation in a usual manner and, on answer by the party at the called substation, requesting that the called party transfer his channel to a data set. Simultaneously the calling party would transfer his channel to a data connection.

Past practice has also included the automatic initiation of a data connection by a calling data set and the automatic answering of the call by another data set. However, the action was related exclusively to a data connection and no transfer from voice to data was required.

It is apparent that under certain conditions it is desirable to initiate either voice calls or data calls over the same channel. Moreover, it is desirable to transfer from a voice termination to a data termination automatically under the control of the originating location.

The increasing utilization of data processing facilities at a large number of relatively remote locations has intensified the need for data transmission among the various units. In certain instances it is useful or more efficient to dispose a central computer facility at a particular location and to provide only ancillary equipment at a plurality of peripheral locations which have access to the central computer for the processing of data originated at the peripheral locations. A typical example of such an arrangement would be a central computing and memory facility for a plurality of branch banks. The information concerning deposits and withdrawals at the branch location is forwarded over telephone wire lines to the central data processor wherein all records are maintained current. The data information necessary to operate the printing equipment at the branch banks for entry of the deposit or withdrawal on the passbook is originated at the central data processor.

Another illustration would be a central reservation system for an air line in which information concerning nationwide operation of all of the flights scheduled, together with reservations and availability of seats, would be transmitted from each of the air line's offices to a central location.

Moreover, information may be returned to each air line office from the central location respecting the availability of seats for a particular flight. It is apparent that under these conditions extensive transfers of data among the participating locations is required.

Although data must be transmitted frequently and rapidly, it is also necessary in many instances to establish voice communication channels among the interconnected offices of air lines, branch banks, etc. Moreover, it is apparent that the provision of voice transmission channels which are separate from the data channels, when both must of necessity couple the same offices and substations, is redundant and economically prohibitive.

It is therefore an object of this invention to provide an integrated data and voice communication system.

A further object of this invention is to provide a system for data and voice communications in which connections are extended over a switched telephone network.

Although the continued automation of switching technology is desirable and necessary, it will be apparent to those skilled in the art that, on occasion, it is possible for wholly automatic facilities to be subject to disabilities which may, with appropriate intervention by an attendant, be easily remedied.

For example, certain automatic call originating devices are arranged to reoriginate a call which is not completed within a predetermined period of time by again transmitting the directory number of the called station. This practice may be followed repeatedly in accordance with the automatic program of the calling equipment.

If the answering device is also automatic it is possible for various reasons, including the inability of the answering arrangement because of traffic, fault conditions, etc. to be unable to complete the call. A wasteful cycle is thus apparent; the automatic calling device originates the call and when the network has established a connection to the automatic answering device, the latter delivers a signal indicative of its inability to complete the connection. Thereupon the calling device recognizes the signal and initiates a disconnection of the established channel preparatory to again transmitting the directory number digits of the called device. Once more the switching channel is established to the called device which returns the same signal. This process may continue indefinitely unless safeguards are incorporated in either or both of the devices to prevent the repeated seizures of the switching facilities. Apart from the inability to promptly establish the desired connection, it will be recognized that since a public or switched network is utilized between the calling and called stations, other legitimate calls are being prevented from utilizing those switching facilities which are preempted to serve the call.

It is therefore a further object of this invention to provide for the transfer from a voice termination to a data termination in an integrated communication system and to retransfer from the data termination to the voice termination if the data receiving equipment fails (by reason of malfunction, for example) to "answer" within a predetermined adjustable period, to thus permitting an attendant at the calling station to thereupon initiate voice communication with the called station.

These and other objects and features of the invention may be achieved in a specific illustrative embodiment in which an integrated communication substation includes both voice and data terminations. Under normal quiescent conditions the telephone termination is connected to the transmission channel. In response to an automatic incoming data call a transfer circuit in accordance with the invention disconnects the transmission path from the telephone termination and couples it temporarily to a multifrequency signal transmitting and receiving unit. The latter awaits signals indicative of an automatic data call and, if received, delivers appropriate indications to the data termination equipment to effect an automatic answer of the call. If the data equipment answers the call within a predetermined timing interval, a connection is extended from the transmission path to the data termination equipment in accordance with the desired data mode, i.e., send or receive. Since illustratively a 4-wire transmission path is used, a data call in the send mode results in the connection by the transfer circuit of the transmit pair of the four conductors to the data equipment while the receive pair remains connected to the multifrequency signal unit. Similarly, a connection in the receive mode results in the extension of the receive pair of the four conductors to the data termination equipment while the transmit pair remains connected to the multifrequency signaling unit. The connections to the multifrequency unit are maintained in order to permit transfer of control signals between the data equipments at opposite ends of the transmission channel.

Since the data calls are effected over switched telephone networks, provisions are made, in the event that an automatic answer fails to occur within the prescribed interval, for a retransfer of the four conductors to the telephone termination. Thus, it is possible to proscribe repeated automatic calls with the accompanying preemption of switching facilities.

These and other objects and features of the invention may be more readily comprehended from an examination of the following specification, appended claims and attached drawing in which:

Figures 1, 8:
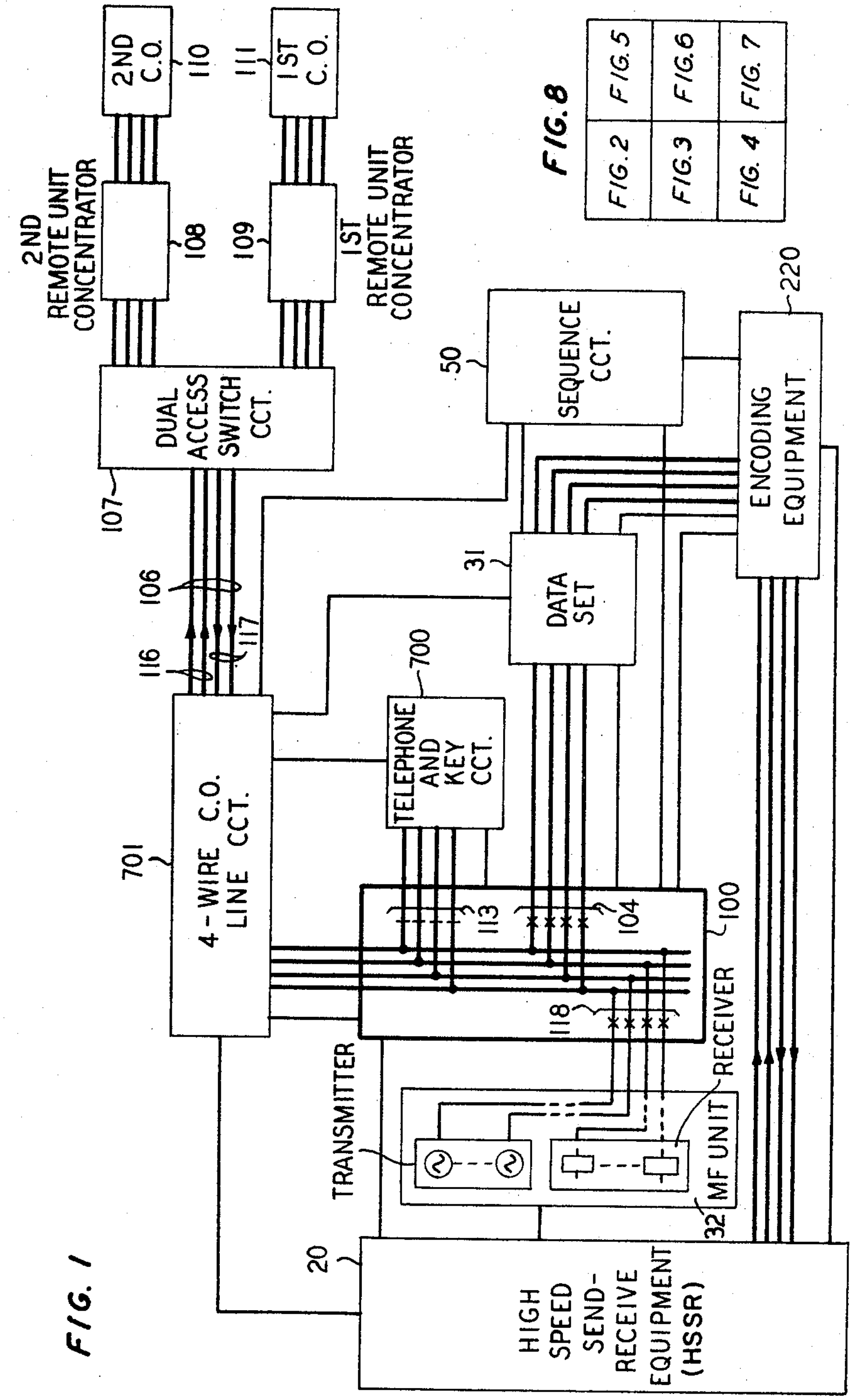
FIG. 1 shows a block diagram of a specific illustrative embodiment of the invention wherein the transmission paths are shown in bold lines and the control paths in lighter lines.
Figure 4:
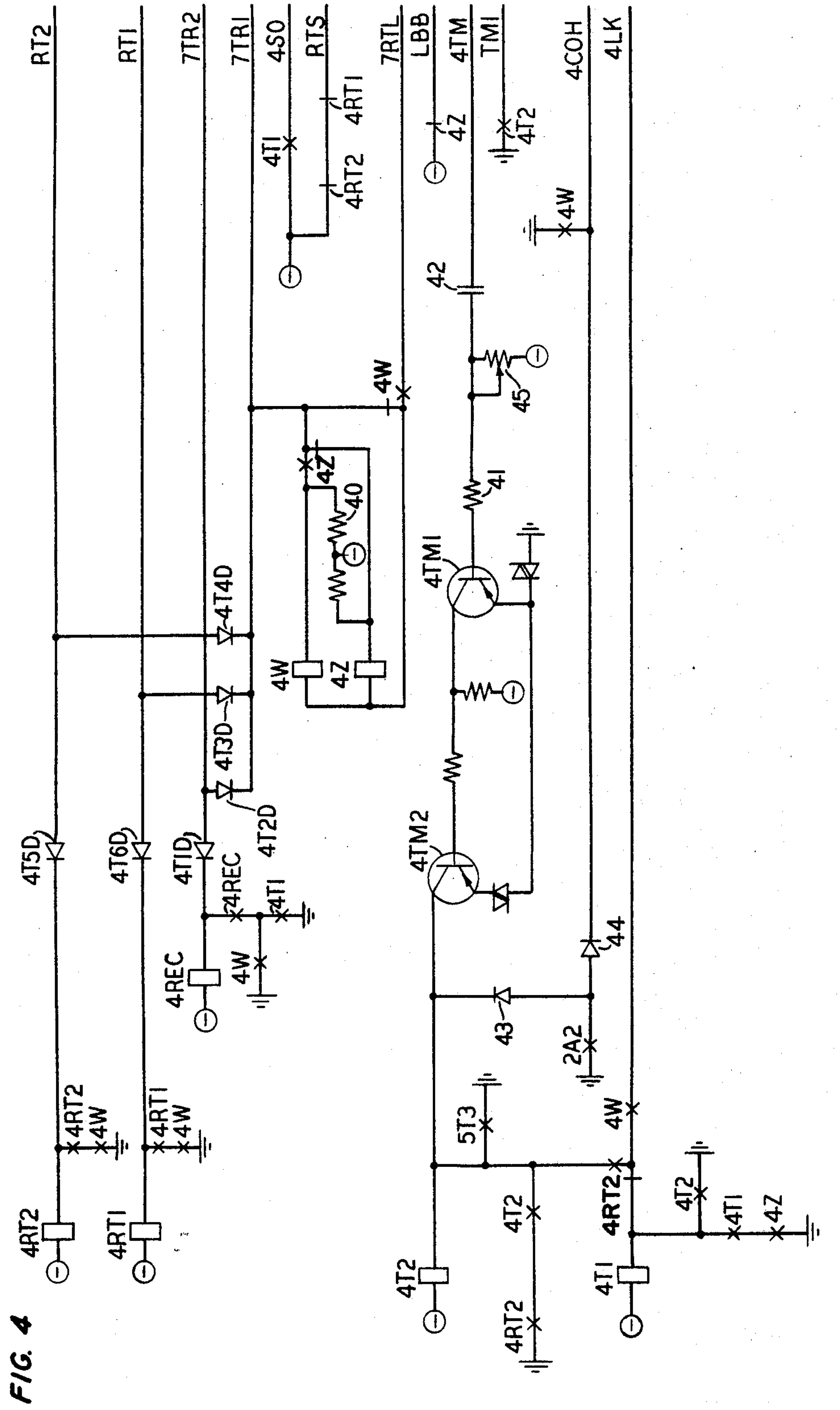
Figure 5:
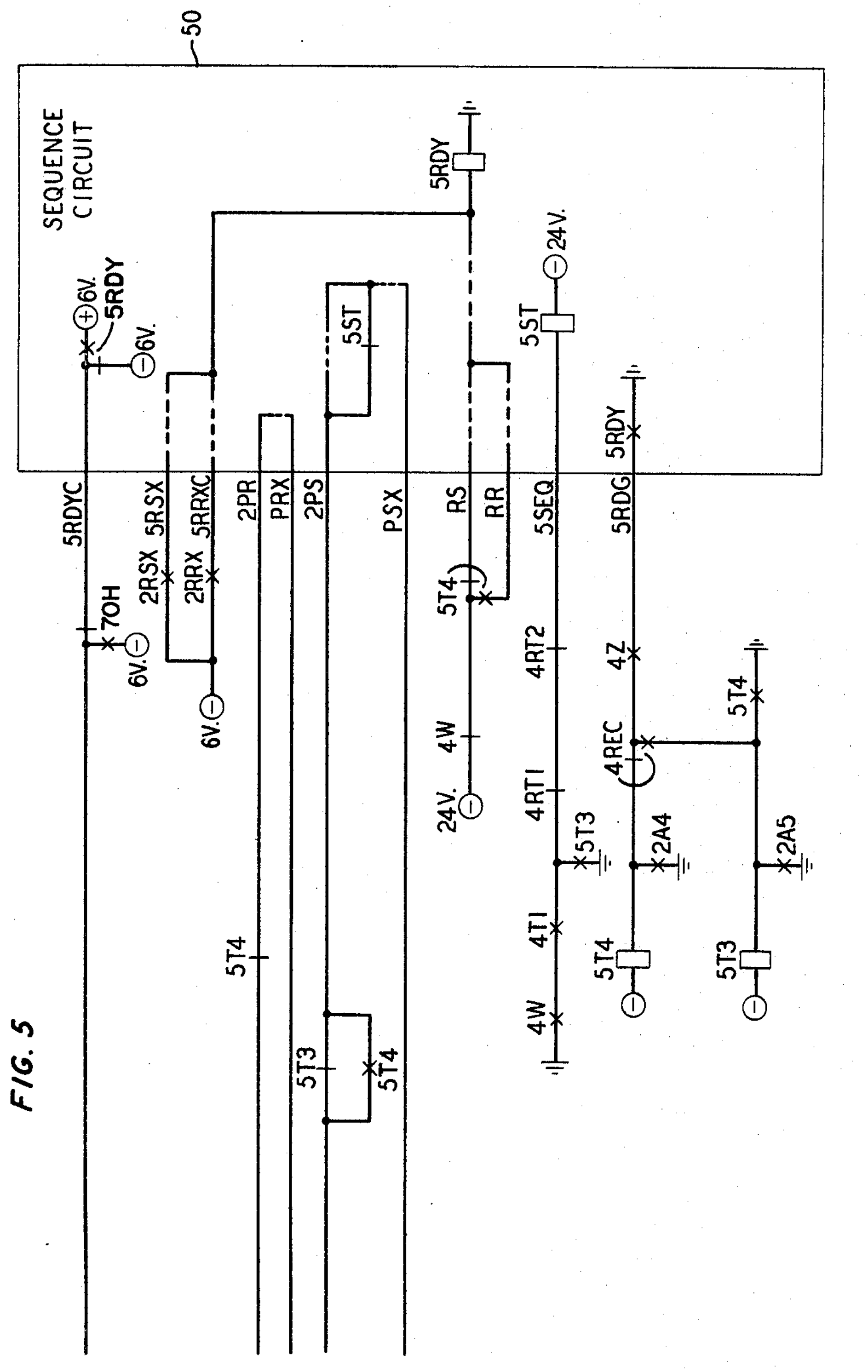
Figure 6:
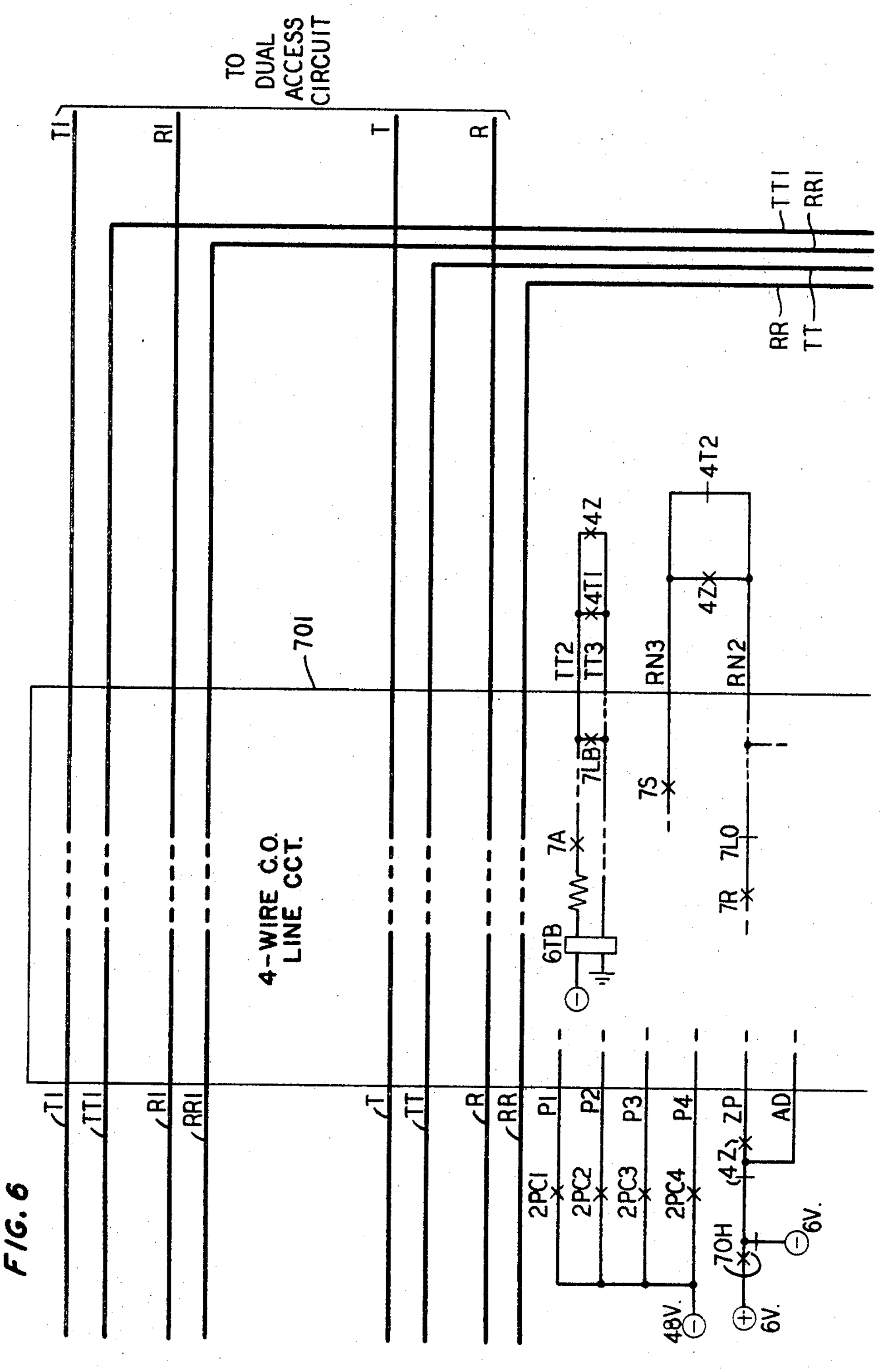
Figure 7:
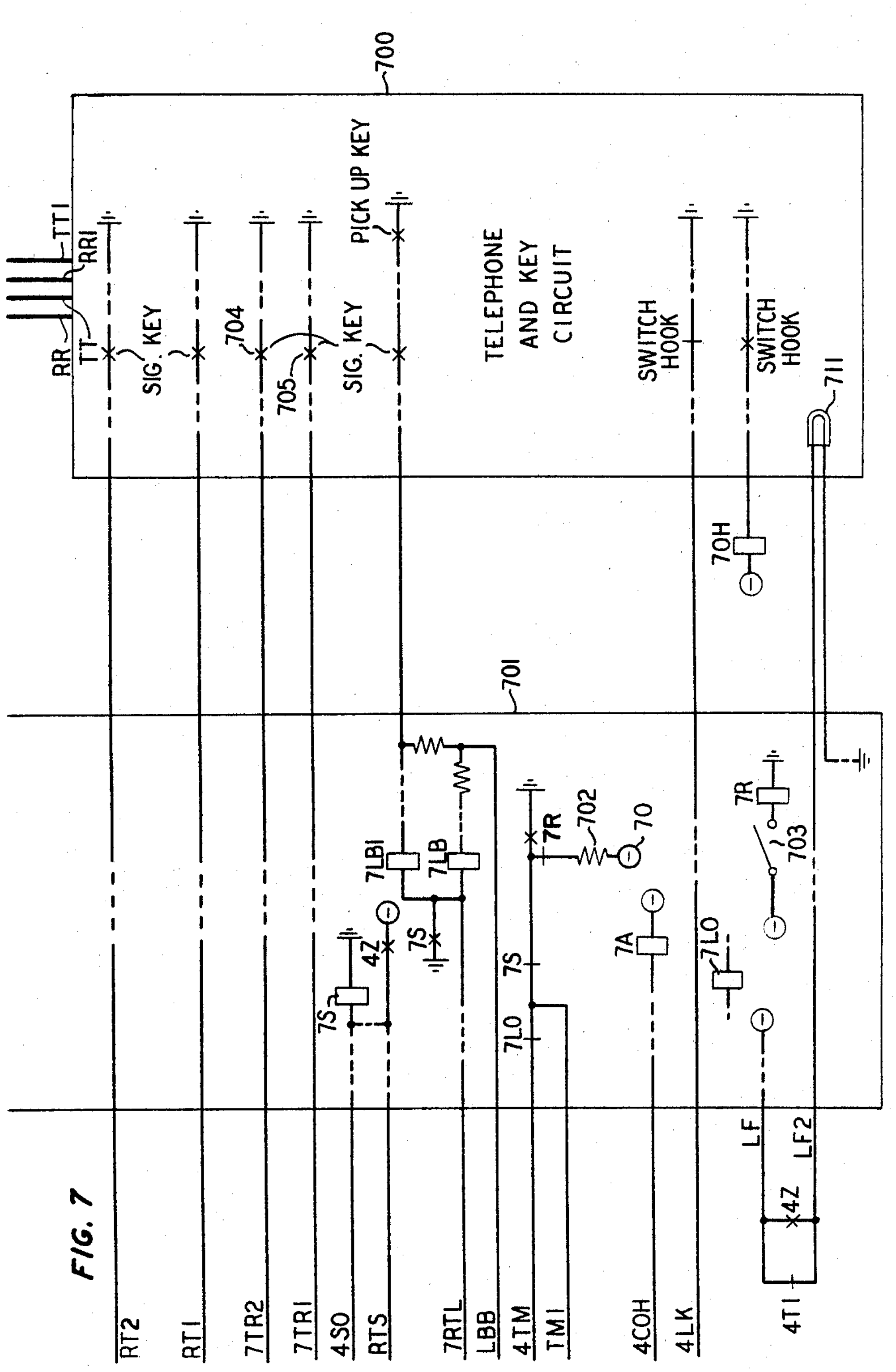

FIG. 4 includes portions of the timing facilities effective in transferring from voice to data terminations and vice versa;

FIG. 5 shows portions of the sequence circuit and also the remainder of the transfer facilities for transferring from data to voice terminations and from voice to data terminations;

FIGS. 6 and 7 show portions of the line circuit and voice termination equipment; and FIG. 8 shows the appropriate disposition of FIGS. 2–7.

GENERAL DESCRIPTION

FIG. 1 shows, in block outline, a transfer circuit in combination with an integrated data and voice communication system. The transfer circuit 100 is utilized to couple the high-speed send and receive equipment 20 (hereinafter HSSR) over the encoding equipment 220, 4-phase data set 31 and symbolic contacts 104 to the 4-wire central office line circuit 701. A transmission path 106 thereupon extends to the dual access switch 107 explained in detail in the copending application Ser. No. 500,774 of Michael-Morse-Oram-Roccati-Smith filed on even date herewith. As disclosed in the above-referred-to application, the dual access switch 107 may be connected over separate concentrators 108 and 109 to central offices 110, 111 associated therewith. The concentrators are described in application Ser. Nos. 501,878 and 500,972 of Clement-Compton-Stagg-Zebe and C. W. Zebe, respectively both filed Oct. 22, 1965.

In FIG. 1 the speech and data transmission channels are shown in bold outline and the control paths in lighter outline.

The speech path extends from telephone and key circuit 700 over the symbolic contacts 113 to the 4-wire line circuit 701. MF (multifrequency) equipment 32 is utilized to transmit supervisory and control signals to the central office as explained herein. Sequence circuit 50 is arranged to coordinate the synchronizing of the HSSR equipment, the encoding equipment and the data sets, also as explained herein in detail.

GENERAL DESCRIPTION OF OPERATION

Transfer from telephone termination 700 to the data termination 31 may be initiated at telephone set 700 by momentarily operating a transfer key not shown herein but shown in detail in FIG. 7, when the telephone set is off-hook and the line key is operated. Thereupon, the transfer relay is operated as shown symbolically by the actuation of contacts 104 and contacts 113. After the transfer circuit 100 is operated, signals are exchanged between the transfer circuit 100, the HSSR equipment 20, sequence circuit 50, and the encoding equipment 220.

The transfer circuit 100 thereupon indicates to the HSSR equipment 20 that an off-hook condition exists at telephone circuit 700 and also indicates the operating mode, send, or receive. The HSSR equipment thereupon supplies signals to the transfer equipment 100 preparatory to a transfer to the data mode, after the HSSR equipment receives a ready signal indication from sequence circuit 50. The latter indication is provided when the data set 31 and the encoding equipment 220 have completed their synchronizing functions.

Transfer circuit 100 thereupon connects line circuit 701 to the data equipment to effect the selected data mode. Thus, the transmit pair 116 of line 106 is connected to the data set 31 if the data set is operating in the send mode. The receive pair 117 is connected to the data set if the latter is operating in the receive mode. That pair, 116 or 117, which is not connected to data set 31 is connected to MF equipment 32. By utilizing signals transmitted from the MF equipment 32, the receiving station can send information to the transmitting station respecting the operating procedure for the HSSR equipment 20.

When data transmission is completed, the subscriber line 106 is reconnected to the telephone set 700 and the transfer circuit is released. Here again, the transfer is effected by operating a transfer key at the telephone station 700 which controls the energization of symbolic contacts 104 and 113.

Line 106 may be transferred to the data termination 31 automatically. Under these conditions the MF unit 32 at the calling station awaits the reception of a start-dial indication under control of HSSR equipment 20. Subsequently, the MF unit 32 is controlled to dial the directory number of the called station as well as a code signal indicating that the call is automatic. Thereafter, the called station is signalled by the central office and responds by connecting the MF unit of the called station (not shown) to the transmit and receive pairs extending to the central office. The HSSR equipment at the local and distant units may then communicate via the MF units at the respective locations.

When all information concerning the type of data transmission has been delivered, a subsequent transfer of the data set 31 to the central office line circuit on one of the line pairs and the connection of the MF unit to the other line pair is effected. When synchronization is completed, an indication is made to the HSSR equipment 20 so that data may be transmitted. Subsequently, on completion of data transmission, the circuit is automatically disconnected.

DESCRIPTION OF MAJOR COMPONENTS

Figure 2:
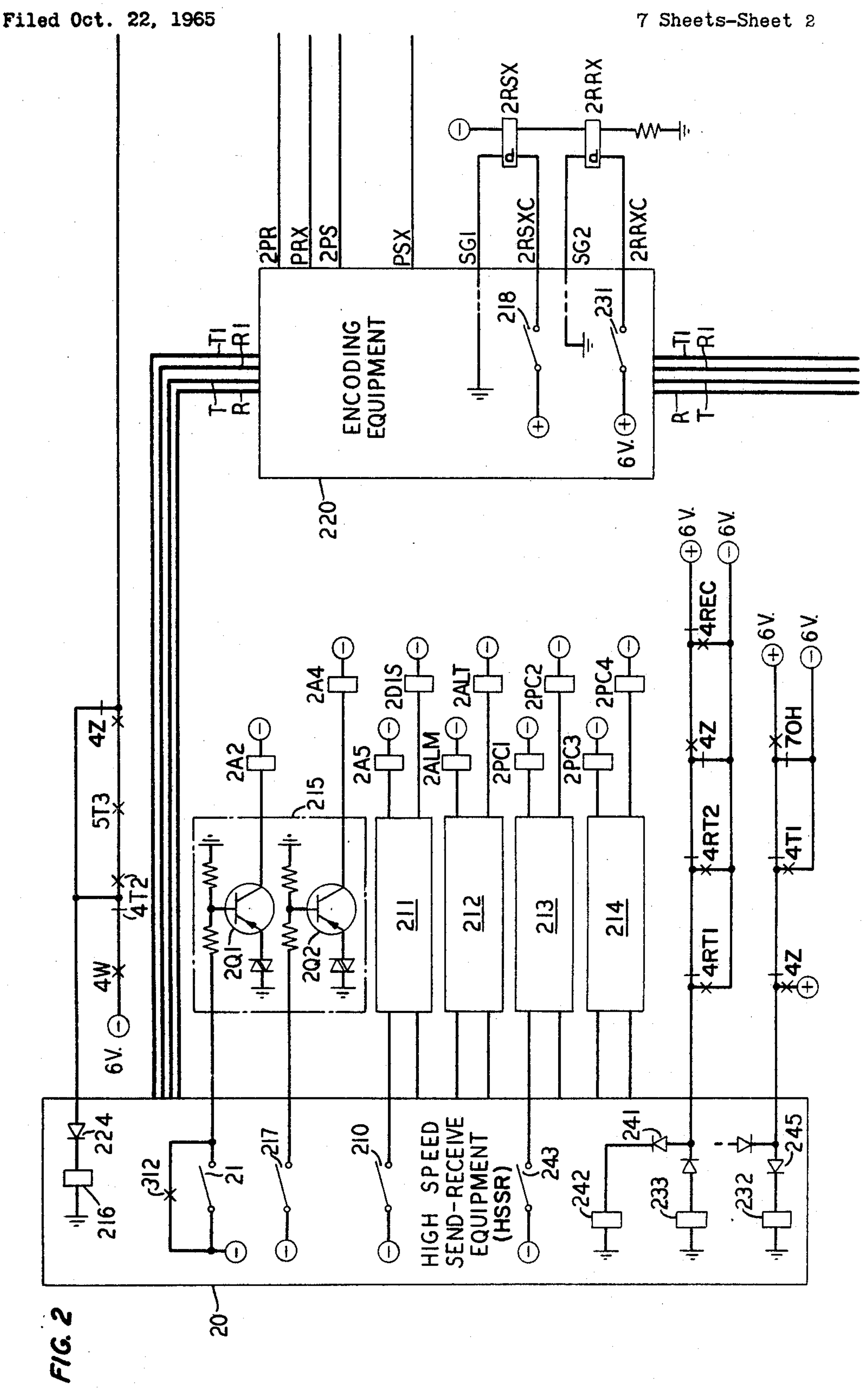
FIG. 2 shows portions of the high-speed send and receive equipment and of the encoding equipment which is utilized to encode signals delivered by the high-speed send and receive equipment.

In FIG. 2 data transmitting and receiving equipment 20 is shown in outline form but it is understood that the equipment 20 may comprise any high-speed data equipment such as high-speed "Teletype" equipment. Encoding equipment 220 is similarly shown in outline form and may be of any suitable type for use in conjunction with data equipment 20 and the data set 31 where encoding is desired. The latter data set includes transmission and receiving facilities which may illustratively be of the type described in Patents 3,128,342 and 3,128,-343 issued Apr. 7, 1965 to P. A. Baker.

The MF unit 32 shown in outline form includes facilities for receiving and transmitting multifrequency code signals. Multifrequency sending and receiving equipment are shown in detail in Patents 2,288,251 to P. B. Murphy of June 30, 1942; 2,332,912 to G. Hecht of Oct. 26, 1943; 3,128,349 to F. T. Boesch of Apr. 7, 1964; and 3,076,059 to L. A. Meacham et al. of Jan. 29, 1963 and the patents therein referred to. Collectively, HSSR equipment 20, encoding circuitry 220, and data set 31, constitute facilities for transmitting encoded data to a remote location or receiver over a path including a central office. The data transmission path is illustratively of the 4-wire type and may be clearly discerned in FIGS. 2, 3 and 6 by the bold outline conductors.

The subject arrangement also provides for shared use of the path to the central office by speech equipment including a telephone and key circuit 700. The latter also provides a 4-wire transmission path which is connected to the central offce by a transfer circuit including the contacts of relay 4T1.

Figure 3:
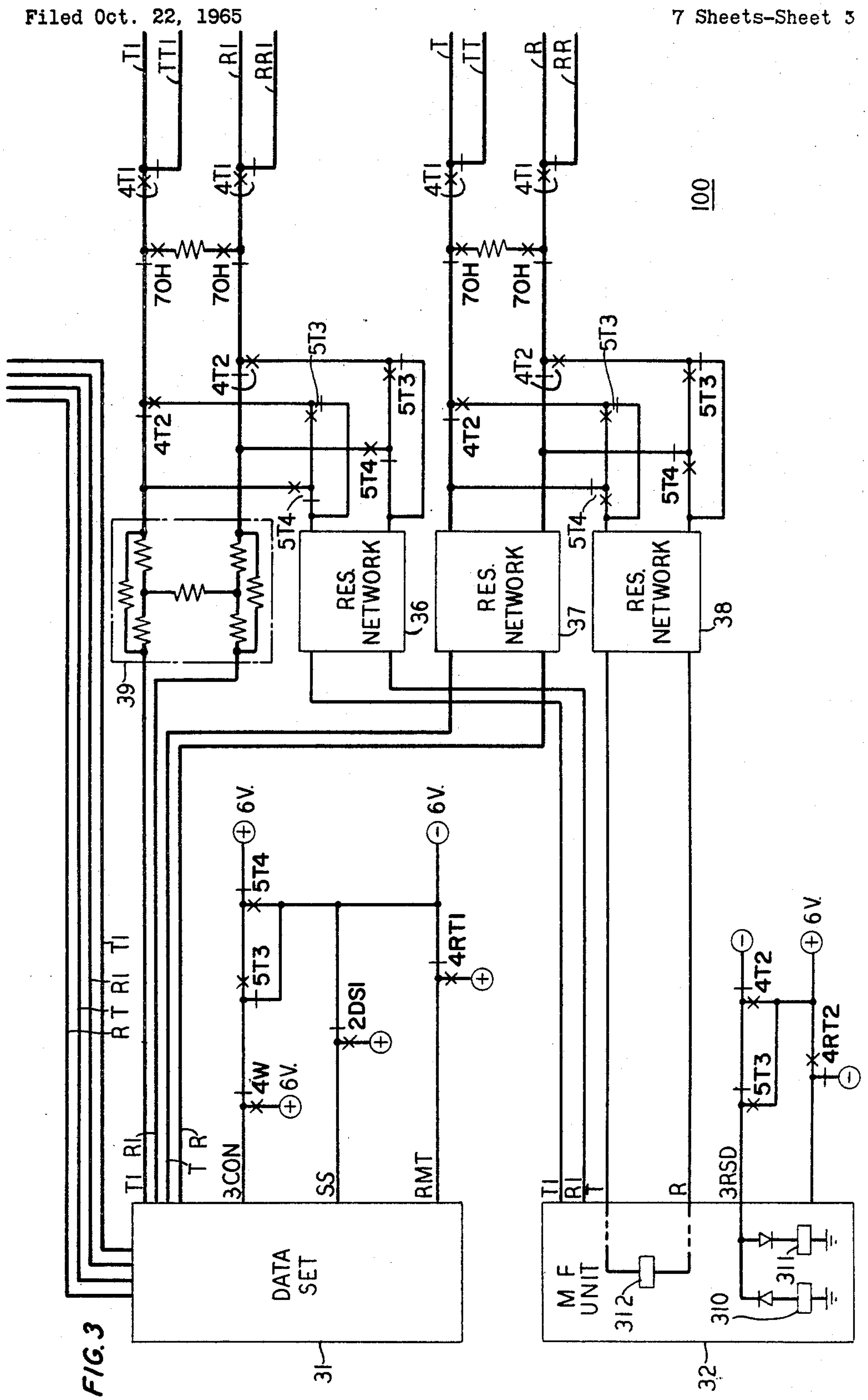
FIG. 3 shows portions of the data set facilities used to couple the high-speed send and receive equipment of FIG. 2 to the transmission channel, also portions of the multifrequency signaling equipment utilized for control signaling and reception, and part of the transfer facilities for transferring from voice terminations to data terminations and vice versa.

As shown in FIG. 3 when the contacts of relay 4T1 are released, the telephone circuit 700 is connected to conductors T1, R1, T and R extending to the dual access circuit and central office.

When relay 4T1 is operated, the data set 31 is instead connected to the 4-wire path extending to the office whereupon data may be transmitted from HSSR equipment 20, encoded in equipment 220 and transmitted by data set 31 to a distant location.

The line circuit 701 of FIGS. 6 and 7 includes supervisory and other control equipment for coupling the telephone circuit to the transmission path as explained herein in detail. The sequence circuit 50 includes facilities for effecting the synchronization of the encoding equipment 220 and the data set 31 preparatory to the transmission of data signals to the office.

Transistor circuits 221–214 are similar to those shown in detail for circuit 215 and are responsive to signals from HSSR equipment 20 to operate the respective relays.

DETAILED DESCRIPTION—INCOMING CALL

Transistor 4TM1 is normally biased in the on condition by current through resistance 41 and potentiometer 45. The collector potential of transistor 4TM1 is approximately at the emitter potential of transistor 4TM2 which latter is biased in the off condition. Capacitor 42 is charged over a path from resistance 41, capacitor 42, conductor 4TM, contacts of relays 7L0, 7S and 7R, resistance 702 to battery 70. Conductor 4TM is switched to a ground condition when the contacts of relay 7R are operated in response to an incoming calling signal as shown symbolically by the operation of switch 703. This type of signaling is further described in the above-referred-to application of Michael-Morse-Oram-Roccati-Smith. When the negative side of capacitor 42 is grounded, the other side of the capacitor shifts to a potential above ground which causes transistor 4TM1 to turn off and transistor 4TM2 to turn on. Capacitor 42 discharges through potentiometer 45 in a period of time determined by the potentiometer setting. Relay 4T2 operates in response to the energization of transistor 4TM2.

When relay 4T2 is operated, the MF unit 32 is energized by the positive 6-volt potential connected over contacts of relays 4T2, 5T3 and the request-to-send lead 3RSD as shown symbolically by the operation of relay 311. In addition, relay 4T1 is operated over the contacts of relay 4T2. Operation of relay 4T1 connects a battery potential over conductor 4S0 to the line circuit to operate relay 7S. Moreover, relay 6TB is prepared for operation at the contacts of relay 4T1 in the event that an automatic answer occurs. The operation of relays 4T1 and 4T2 transfer the customer line from the telephone termination to the MF unit. Thus, a path may be traced in FIG. 3 from the MF unit 32, over conductor T1, resistance network 36, contacts of relays 5T3, 4T2, 70H, 4T1 to conductor T1 extending to the dual access circuit and thereafter to the central office. A similar path may be traced for the remaining three conductors of the customer line circuit from the MF unit.

The circuit remains in this condition until the call is answered automatically by equipment 20 as described herein or until the call is released by the timing action of transistors 4TM1 and 4TM2.

AUTOMATIC ANSWER OF INCOMING CALL

The MF unit 32 energizes HSSR equipment 20 if it detects a signal indicative of an automatic call. This procedure is shown symbolically by the operation of relay 312 whose make contact extends a negative 6-volt signal to the base electrode of transistor 2Q1 and causes relay 2A2 to operate. Operation of relay 2A2 provides a holding path for relay 4T2 over diode 43. In addition, a ground condition is applied over conductor 4C0H to operate relay 7A in the line circuit 701. The line circuit reflects the off-hook condition to the central office by means not shown herein as not essential to an understanding of the present invention but described in the above-referred-to application of Michael-Morse-Oram-Roccati-Smith. At this time the circuit is prepared to respond to signals representing orders to enter the automatic receive mode or the automatic send mode.

If the incoming call is preparatory to a transmission to HSSR unit 20, automatic transfer to the receive mode will be effected. In response to signals received by MF unit 32 indicative of an order to transfer to the receive mode, equipment 20 will energize transistor facilities similar to that shown for transistor 2Q1 to cause the operation of relay 2A5. This procedure is shown symbolically by the actuation of switch 210. When relay 2A5 is operated a ground condition is extended to the winding of relay 5T3 causing it to operate. The operation of relay 5T3 effects a transfer of the receive pair T and R of the customer line from MF unit 32 to data set 31. Thus a path may be traced in FIG. 3 from data set 31, conductor T, resistance network 37, contacts of relays 5T4, 5T3, 4T2, 70H and 4T1 to conductor T extending to the line circuit 701 and the dual access switch 107 of FIG. 1. A similar path may be traced for conductor R from data set 31 to conductor R extending to the dual access switch. At this time the transmit pair T1 and R1 remains connected to MF unit 32.

A ground is extended to lead 5SEQ over the contacts of relays 5T3, 4RT1 and 4RT2 to operate relay 5ST in the sequence circuit. The latter undertakes to initiate synchronization of the local data set 31 and the distant data set (not shown). A positive 6-volt potential is connected over contacts of relays 5T4, 5T3 and 4W to lead 3C0N of data set 31 to inhibit timing therein until a carrier signal from the distant end is detected. In addition, lead 2PS is opened at the contacts of relay 5T3 to prevent the sequence circuit 50 from preparing the transmitter of the encoding unit 220 since the latter is not operative in the receive mode.

When the synchronizing cycle is completed the encoding unit will connect a positive 6-volt potential on conductor 2RRXC as shown symbolically by the operation of switch 231. Thereupon relay 2RRX is operated and extends a negative 6-volt potential over conductor 5RRXC to the sequence circuit. Relay 5RDY is energized and extends a positive 6-volt potential over conductor 5RDYC, contacts of relays 70H, 4Z, diode 224 to the winding of relay 216 of FIG. 2. Operation of relay 216 is indicative of a ready condition in the HSSR equipment which is now prepared to receive data.

The path for data reception may be traced in the case of conductor T from the dual access circuit, line circuit 701, contacts of relays 4T1, 70H, 4T2, 5T3, 5T4, resistive network 37, conductor T, data set 31, conductor T, encoding equipment 220 and conductor T to HSSR unit 20. A similar path may be traced for conductor R.

AUTOMATIC TRANSFER TO THE SEND MODE

In response to unique signals received by MF unit 32 indicative of a request to transfer to the send data mode relay 2A4 is energized. This procedure is shown symbolically by the operation of switch 217 which causes the energization of transistor 2Q2. Operation of relay 2A4 causes the energization of relay 5T4 over an obvious path. Relay 5T3 operates over the contacts of relay 5T4. When relay 5T3 is operated conductors T1 and R1 are disconnected from MF unit 32 and connected instead to the data set 31. Thus a path may be traced for conductor T1, from data set 31, resistive network 39, contacts of relays 5T4, 5T3, 4T2, 70H, 4T1 and conductor T1 extending to the line circuit and to the dual access switch. A similar path may be traced for conductor R1. In this case the receive pair T and R of the customer line remains connected to MF unit 32 over the contacts of relays 5T4 and 5T3.

The operation of relay 5T3 extends a ground condition over lead 5SEQ to operate relay 5ST and to initiate the synchronizing procedure in the manner described above for an automatic transfer to the receive mode. Conductor 2PR is opened at the contacts of relays 5T4 to prevent the sequence circuit from delivering signals to the encoding equipment to prepare that equipment for receiving. Equipment 220 connects a positive 6-volt potential to conductor 2RSXC when the synchronizing cycle is completed as shown symbolically by the operation of switch 218. Relay 2RSX operates and in FIG. 5 connects a negative 6-volt potential to lead 5RSX. Relay 5RDY is operated and again a positive 6-volt potential is connected to lead 5RDYC which causes the operation of relay 216 over the path described above. Under these conditions HSSR equipment 20 is prepared to transmit data.

RETRANSFER TO TELEPHONE SET ON FAILURE TO AUTOMATICALLY ANSWER

In either of the above examples concerning automatic transfer to the send mode and automatic transfer to the receive mode relay 4T2 is held operated over the contacts of relay 5T3. If the circuit had failed (e.g., as a result of malfunction) to automatically answer, relays 312 and 5T3 would not operate, transistors 4TM1 and 4TM2 would return to the on and off conditions, respectively, and relay 4T2 followed by relay 4T1 would release. When relays 4T2 and 4T1 are released, the conductors T1, R1, T and R are returned to the telephone circuit 700. Thus a path may be traced for conductor T1 over the contacts of relay 4T1, conductor TT1 to the line circuit 701 and to the telephone and key circuit 700.

AUTOMATIC OUTGOING CALL

In initiating a call to a distant unit the attendant at the local unit energizes the HSSR equipment as shown symbolically by the operation of switch 21 which actuates relay 2A2 in response to the energization of transistor 2Q1. The operation of relay 2A2 causes the operation of relay 4T2 over diode 43. Moreover, a ground condition is applied over diode 44 and conductor 4C0H to operate relay 7A. Operation of relay 7A provides a station off-hook condition to the central office by means not shown herein as not essential to an understanding of the present invention. When the call is detected at the central office, a path is extended to the calling line as described in detail in the copending application of Clement-Compton-Stagg-Zebe filed on even date herewith. The MF unit 32 delivers signals indicative of the called station. When the latter answers, a signal indicating the desired operating mode, send or receive, or is forwarded. When the MF signaling is completed the circuit will transfer to the receive data mode or the send data mode as above described.

MANUAL INCOMING CALL

When a call is originated at the distant end in the manual mode, the MF unit 32 does not receive an automatic calling signal and relay 312 does not operate. The absence of this signal causes the release of relay 4T2 after the timing period determined by capacitor 42 and potentiometer 45. At this time the circuit is returned to the telephone set 700 in the manner described above for failure to automatically answer an incoming call. This permits lamp 711 to be flashed in a conventional manner over the contacts of relay 4T1, and when the call is answered, the flashing lamp is retired.

MANUAL OUTGOING CALL

When the switchhook contacts are closed upon removal of the handset from its mounting, a ground condition is extended to operate relay 70H. The latter completes a path for the extension of a positive 6-volt potential over the contacts of relays 70H, 4T1, 4Z to the HSSR unit. Relay 232 is operated over this path and diode 245 and, through means not shown herein prevents data from being transmitted or received. Relay 70H also disconnects the customer line from the data equipment to positively prevent the transmission for reception of data.

MANUAL TRANSFER TO RECEIVE MODE

When an attendant at telephone set 700 operates key 704, a ground condition is extended over conductor 7TR2 to operate relay 4REC over diode 4T1D. Relay 4REC locks operated over its own contacts and contacts of relay 4W. Relay 4W operates over conductor 7TR2, diode 4T2D, contacts of relay 4W, winding of relay 4W, resistance 40 to negative battery. The ground condition on lead 7TR2 shunts the winding of relay 4Z and prevents the operation of relay 4Z until ground is removed from lead 7TR2. When key 704 is released relay 4Z operates and remains operated over conductor 7RTL.

The operation of relay 4W results in the application of a ground condition over conductor 4C0H to operate relay 7A which maintains line circuit 701 in an operated state after the telephone set returns on-hook. Relay 4T1 is extended over the contacts of relays 4RT2 and 4W to lead 4LK and to ground at the switchhook contacts preparatory to operation when the telephone set goes on hook. A positive 6-volt potential is connected to lead 3C0N over the contacts of relay 4W to inhibit data set timing until the carrier signal from the distant end is detected. Moreover, relay 216 is operated in FIG. 2 over the contacts of relays 4W and 4T2 to prevent HSSR unit 20 from sending or receiving information until the transfer to the data mode occurs. A negative 6-volt potential is connected over the contacts of relays 4REC, 4Z, 4RT2 and 4RT1 to operate relay 233 as an indication of a manual receive operating mode.

Relay 4Z provides a hold path for relay 6TB to insure off-hook supervision to the office when the telephone set 700 returns to the on-hook condition.

The operation of relay 4T1 as explained above connects the customer line to the data set and connects a ground condition in FIG. 5 over the contacts of relays 4W, 4T1, 4RT1, 4RT2, conductor 5SEQ to relay 5ST to initiate synchronization of the data units.

When the synchronizing is completed sequence circuit 50 extends a ground condition over the contacts of relay 5RDY, conductor 5RDG, contacts of relays 4Z, 4REC, winding of relay 5T3 to operate relay 5T3 and in turn operate relay 4T2.

At this time the receive pair T and R of the customer line is connected to the data set 31 and the transmit pair is connected to the MF unit 32. Thus a path may be traced for conductor T of the receive pair over contacts of relays 4T1, 70H, 4T2, 5T3, 5T4, resistance network 37 to data set 31. A similar path may be traced for conductor R.

Moreover, a path may be traced for conductor T1 of the transmit pair over the contacts of relays 4T1, 70H, 4T2, 5T3, 5T4, resistance network 36, to the MF unit. A similar path may be traced for conductor R1.

When relays 5T3 and 4T2 are operated, lead 5RDYC is extended over contacts of relays 70H, 4Z, 5T3 and 4T2 to indicate to the HSSR unit a ready condition for reception of transmission. The HSSR unit may now receive data from the distant unit and the transfer circuit remains in this condition until a manual transfer to the voice mode is accomplished as described herein.

MANUAL TRANSFER TO THE SEND MODE

The attendant operates the signaling key 705 to extend a ground condition to conductor 7TR1 which causes relay 4W to operate. This path may be traced from ground, key 705, conductor 7TR1, contacts of relay 4W, winding of relay 4W, resistance 40 to negative battery. Thereafter the operation is similar to that described above for a manual transfer to the receive mode with the exception that relay 4REC does not operate. Operation of relays 4W and 4Z also performs the functions described above with the exception that a +6-volt potential is connected over the contacts of relays 4REC, 4Z, 4RT2, 4RT1, diode 241, winding of relay 242 to ground to indicate a manual send operating mode to equipment 20. Moreover, relay 5T4 is operated from ground, contacts of relay 5RDY, conductor 5RDG, contacts of relay 4Z, 4REC, winding of relay 5T4 to negative battery. Relay 5RDR is operated as explained above when the synchronizing functions are completed. Relay 4T1 is prepared for operation over the switchhook contacts, conductor 4LK, contacts of relays 4W and 4RT2, winding of relay 4T1 to negative battery. Relay 5T3 is operated over the contacts of relay 5T4 and relay 4T2 operates over the contacts of relay 5T3. In consequence of the operation of relays 5T3, 5T4 and 4T2, the transmit pair T1 and R1 is connected to data set 31 and the receive pair T and R is connected to the MF unit 32. Relay 4T1 operates when the telephone set returns on hook. Thus a path may now be traced from line circuit 701, conductor T1, contacts of relays 4T1, 70H, 4T2, 5T3, 5T4, resistive network 39 to data set 31. A similar path may be traced for conductor R1.

Moreover, a path may be traced from line circuit 701, conductor T, contacts of relays 4T1, 70H, 4T2, 5T3, 5T4, resistive network 38 to MF unit 32. A similar path may be traced for conductor R.

At this time conductor 5RDYC is extended over a path from positive 6-volt battery, contacts of relay 5RDY, conductor 5RDYC contacts of relay 70H, 4Z, 5T3, 4T2, diode 224, winding of relay 216 to ground to indicate a ready condition to equipment 20. At this time data may be transmitted to the distant unit and disconnect occurs in the manner described in detail herein.

DISCONNECT FROM THE MANUAL SEND OR RECEIVE MODE

Prior to disconnecting, a transfer from the data mode to the voice mode is effected by operating either key 704 or 705 to extend a ground condition to release relay 4W by shunting the battery supplying relay 4W over resistance 40. Relay 4Z remains operated after relay 4W releases until key 704 or 705 is released at which time relay 4Z releases.

The release of relay 4Z opens the hold path of relay 5T4 (if in the send mode) or relay 5T3 (if in the receive mode) causing the operated relay to release. Thereupon, relays 4T2 and 4T1 are released at the contacts of relays 5T3 and 4T2, respectively. Relay 4REC is released at the contacts of relay 4T1 and the transfer circuit is now in the idle state with the 4-wire pair T1, R1, T and R reconnected to the telephone circuit 700.

OUTGOING PRECEDENCE INDICATIONS FROM HSSR UNIT

When originating calls are accorded a priority status in the manner described in detail in the above-referred-to disclosure of Clement-Compton-Stagg-Zebe, equipment 20 is arranged to operate relays 2PC1 through 2PC4 in accordance with the degree of priority of the call. If it is assumed that relay 2PC1 is operated as shown symbolically by switch 243, a path will be extended as shown in FIG. 6 from negative battery, contacts of relay 2PC1, to conductor P1, extending to the dual access switch circuit and to the concentrator. Thereafter, the level of priority is registered at the remote concentrator unit in the manner described in the above-referred-to Clement-Compton-Stagg-Zebe disclosure.

It is to be understood that the above-described arrangements are illustrative of the application of the principles of the invention. Numerous other arrangements may be devised by those skilled in the art without departing from the spirit and scope of the invention.

What is claimed is:

1. An integrated voice and data communication system including a transmission channel, a communication substation connected to said channel, said substation including voice termination means and data termination means, transfer means for selectively connecting said voice termination means and said data termination means to said channel, means effective in response to an incoming call to said substation for governing said transfer means to couple said data termination means to said channel, and additional means effective in response to the failure of said data termination means to deliver signals to said transfer means indicative of an automatic answer condition to transfer said transmission channel to said voice termination means.

2. An integrated voice and data communication system in accordance with claim 1 including in addition means in said transfer means responsive to signals indicative of an answer condition by said data termination means for maintaining said connection to said data termination means.

3. An integrated data and voice communication system including a transmission channel, a plurality of communication substations connected to said channel, said substations including voice termination means normally connected to said channel and data termination means connectable to said channel, said data termination means including multifrequency signaling means and data set means, means responsive to an incoming call to one of said substations for effecting the transfer of said normal connection to said transmission channel from said voice termination means to said multifrequency signaling means, said multifrequency signaling means thereafter being responsive to signals delivered over said channel for determining whether said data set means or said voice termination means at said one substation shall be connected to said channel, means for effecting an automatic answer of said incoming call by said multifrequency signaling means, and means controlled by said multifrequency signaling means subsequent to said automatic answer for transferring the connection of said transmission channel to said data set means.

4. An integrated data and voice communication system in accordance with claim 3 including in addition timing means for governing the period in which said multifrequency signaling means are connected to said transmission channel, said timing means including means effective in response to the failure of said transfer means to effect a connection to said data set means within a predetermined time interval for controlling a retransfer of said transmission channel to said voice termination means.

5. A 4-wire integrated voice and data communication system including a transmission channel having a receive pair and a transmit pair, a plurality of communication substations connected to said channel, said substations including data termination means and voice termination means normally connected to said transmit and receive pairs, said data termination means including data set means for delivering data signals to and receiving data signals from said transmission channel and a multifrequency signaling unit for receiving and transmitting control signals preparatory to the completion of connections to said data set means, means responsive to an incoming call to one of said substations for disconnecting said voice termination means from said transmit and receive pairs and for connecting said multifrequency signaling unit to said pairs, and additional means effective in response to the receipt by said multifrequency signaling means of a control signal indicative of a data call to said one substation in the send mode for coupling said transmit pair to said data set and for coupling said receive pair to said multifrequency signaling means.

6. A 4-wire integrated voice and data communication system in accordance with claim 5 wherein said additional means is also effective in response to the receipt by said multifrequency signaling means of a control signal indicative of a data call to said substation in the receive mode for coupling said transmit pair to said multifrequency signaling means and for coupling said receive pair to said data set means.

7. A 4-wire integrated voice and data communication system in accordance with claim 6 including in addition means for timing the interval during which said transmit and receive pairs are simultaneously connected to said multifrequency signaling means, and means effective in response to the failure of said multifrequency signaling means to automatically answer said data call and to connect said data set to said transmission channel within a predetermined interval for controlling the connection of said transmit and receive pairs to said voice termination means.

8. A 4-wire integrated voice and data communication system in accordance with claim 7 wherein said timing means includes a first normally on transistor, a second normally off transistor and a relay controlled by the energization of said second transistor to selectively couple said transmission channel to either said voice termination means or to said multifrequency signaling means, and means effective in response to an incoming call to said substation for de-energizing said first transistor and energizing said second transistor and said relay thereby transferring said transmit and receive pairs from said voice termination means to said multifrequency signaling means, and resistance-capacitance means for controlling the time interval of the de-energization of said first transistor means.

9. An integrated voice and data communication system including a transmission channel, a plurality of substations connected to said channel, said transmission channel including a transmit pair and a receive pair, said substations including voice termination means normally connected to said transmit and receive pairs and data termination means, said data termination means including a multifrequency signaling unit and a data set for delivering data signals to and receiving data signals from said transmit and receive pairs, transfer means for governing the connection of said transmit and receive pairs selectively to said voice termination means and to said data termination means, said transfer means including first relay means for transferring said transmit and receive pairs from said voice termination means to said data termination means, second relay means effective upon the energization of said first relay means for connecting said transmit and receive pairs to said multifrequency signaling unit, third relay means effective in connection with the operation of said data set in the receive mode for connecting said multifrequency signaling unit to said transmit pair and said data set to said receive pair, fourth relay means effective in connection with the operation of said data set in the send mode for connecting said multifrequency signaling unit to said receive pair and said data set to said transmit pair, means effective in response to an incoming call to one of said substations for energizing said first relay means and said second relay means for a predetermined interval preparatory to the reception of control signals indicative of said data set mode of operation, and means effective after said predetermined interval for automatically releasing said first and second relay means.

10. An integrated voice and data communication system in accordance with claim 9 including in addition means effective in connection with the reception of control signals indicative of a receive mode of operation for actuating said third relay means to connect said receive pair to said data set and to connect said send pair to said multifrequency signaling unit.

11. An integrated voice and data communication system in accordance with claim 9 including in addition means effective in connection with reception of control signals indicative of a send mode of operation of said data set for actuating said fourth relay means to connect said transmit pair to said data set and to connect said receive pair to said multifrequency signaling unit.

12. An integrated voice and data communication system in accordance with claim 9 including in addition means effective in response to an automatic answer of said incoming call prior to the expiration of said predetermined interval for preventing the automatic release of said first and second relay means.

References Cited

UNITED STATES PATENTS

| | | | |
|---|---|---|---|
| 2,881,251 | 4/1959 | Strip | 179—2 |
| 3,311,704 | 3/1967 | Filipowsky et al. | 179—2 |
| 3,304,372 | 2/1967 | Filipowsky et al. | 179—2 |

ROBERT L. GRIFFIN, Primary Examiner

WILLIAM S. FROMMER, Assistant Examiner

U.S. Cl. X.R.

179—3